United States Patent

Velluire

[11] Patent Number: 5,971,736
[45] Date of Patent: Oct. 26, 1999

[54] DEVICE FOR JOINING AT LEAST TWO MATERIAL FLOWS IN A LAMINAR COEXTRUSION MACHINE

[75] Inventor: Maurice Velluire, Enchien, France

[73] Assignee: Extrusion de Basse Normandie-Exbanor S.A., Lisieux, France

[21] Appl. No.: 08/945,756
[22] PCT Filed: May 9, 1995
[86] PCT No.: PCT/FR95/00604
§ 371 Date: Feb. 13, 1998
§ 102(e) Date: Feb. 13, 1998
[87] PCT Pub. No.: WO96/35570
PCT Pub. Date: Nov. 14, 1996

[51] Int. Cl.$^6$ .......................... B29C 47/06; B29C 47/14
[52] U.S. Cl. .................................. 425/133.5; 425/382.4; 425/462; 425/465
[58] Field of Search ................................ 425/132, 133.5, 425/382.4, 462, 465; 264/173.16, 167

[56] References Cited

U.S. PATENT DOCUMENTS

| | | | |
|---|---|---|---|
| 2,803,041 | 8/1957 | Hill et al. ................................. | 425/132 |
| 2,985,556 | 5/1961 | Rowland . | |
| 3,274,646 | 9/1966 | Krystof . | |
| 3,432,588 | 3/1969 | Breidt, Jr. et al. . | |
| 3,734,662 | 5/1973 | Harmon et al. . | |
| 3,806,293 | 4/1974 | Taureck et al. ........................... | 425/132 |
| 4,402,889 | 9/1983 | Bonis .................................... | 425/133.5 |
| 5,137,675 | 8/1992 | Rabe . | |

FOREIGN PATENT DOCUMENTS

| | | |
|---|---|---|
| 0652097 | 5/1995 | European Pat. Off. . |
| 92986 | 1/1969 | France . |
| 2320174 | 3/1977 | France . |
| 2921943 | 12/1980 | Germany . |
| 3405744 | 8/1985 | Germany . |

OTHER PUBLICATIONS

*Patent Abstracts of Japan*, vol. 13, No. 52 (M–794), Feb. 7, 1989, as it relates to JP–A–63–256418 (Toray Ind. Inc.) Oct. 24, 1988.

*Primary Examiner*—Harold Pyon
*Assistant Examiner*—Joseph Leyson
*Attorney, Agent, or Firm*—Kerkam, Stowell, Kondracki & Clarke, P.C.; John C. Kerins

[57] ABSTRACT

The invention relates to a device for joining together at least two material flows in a laminar coextrusion machine comprising at least two extruders, more precisely as many extruders as layers of different materials used, a device for joining together the flows coming from the extruders into a so-called global flow, said device being also called a distribution box, and an extrusion head supplied by the global flow. The joining device includes a main channel wherein open annexed channels called supply channels convey the different material flows coming from the extruders, the channels being provided with means for restricting the flow passage cross-section. The supply channel connecting each extruder to the main channel is at least partially in the form of a cylindrical plug valve having means which transform a cylindrical rod into a planar sheet.

11 Claims, 3 Drawing Sheets

DEVICE FOR JOINING AT LEAST TWO MATERIAL FLOWS IN A LAMINAR COEXTRUSION MACHINE

BACKGROUND OF THE INVENTION

1. Field of the Invention

The invention relates to a device for joining at least two material flows in a laminar coextrusion machine.

2. Description of Related Art

Extrusion machines are used to transform plastic raw material into a sheet that can then be worked.

The plastic materials known at this time have specific characteristics.

Also, there is no single plastic material which combines all the characteristics desired for a particular use.

For example, some materials have good mechanical strength while others are resistant to external factors, such as ultraviolet rays, and still others are particularly suitable for working at high or low temperatures.

In order to obtain an object having the desired characteristics, it is known to produce multilayered products by means of a process known as coextrusion.

There are two types of coextrusion, one called "manifold" coextrusion which consists of using, for each material, an extruder and as many extrusion heads as there are layers to be constituted.

These heads converge on an extrusion die where the layers are joined.

With this type of coextrusion, each material is handled separately along its entire path, which makes it possible to use extremely different materials with widely varied melting points, but operation is very complex and the material very expensive.

The other coextrusion process, which is the one to which the invention relates, is the process known as laminar extrusion.

In this process, the joining of the layers takes place in a channel disposed upstream from a single extrusion head in a tool called an extrusion box.

For this reason, the different layers must move at the same speed and continuously in order to prevent any shear.

It is therefore necessary to obtain a laminar flow in each layer.

In order to obtain and maintain this laminar flow, it is necessary to reduce the causes of disturbances, that is mainly, the losses of pressure that result in changes in the cross-section of the channels for transporting the flows and in their directions.

A laminar coextrusion unit of this type comprises:

at least two extruders and, more precisely, as many extruders as there are layers of different materials to be joined, downstream from the extruders, a device for joining the different flows issuing from the extruders into a so-called global flow, this device also being called a distribution box, and downstream from this joining device, an extrusion head supplied by the global flow.

This joining device essentially comprises a main channel into which opens, for each material flow, a so-called supply channel connecting each end to the main channel.

In the first coextrusion systems, the flow of a first viscous material was introduced into this extrusion box in the form of a cylindrical rod which constituted the core of the product, and the other flows conformed to the circular cross-section of the flow up to its outlet, where all of the flows were then transformed into a planar sheet with the aid of a geometric transformation means.

This geometric transformation means was essentially comprised of a so-called geometric transformation channel of rectangular cross-section which was perpendicular to the axis of movement of the rod downstream from the main channel and wherein the cross-section of this geometric transformation channel increased in at least one of the two dimensions of its cross-section, and in the direction of movement of the flow, until the desired cross-section was obtained.

This geometric transformation on output is not easy to obtain given that this is a multi-component product with different viscosities and properties.

Thus, it was difficult to conform to the different tolerances of each layer.

In order to eliminate the problems of the geometric transformation of a multi-layer rod, it is known to preform each layer before they are joined, and for this reason, the above-mentioned geometric transformation means is placed in the path of each extruder flow and upstream from the point at which these flows are joined (U.S. Pat. No. 5,137, 675).

Thus, extrusion devices become extremely complicated when it is necessary to equip the extruders with a multiplicity of parts designed to be removable for cleaning.

The devices are even more complicated when each supply channel of the joining device comprises means for adjusting the flow.

In the known solutions, the means for adjusting the flow essentially comprise a restricting bar which is placed across the flow in order to modify the cross-section of flow of the supply channel.

At the present time, these adjusting means are placed at a non-negligible distance from the plane in which the supply channel of the extruder in question connects to the channel for joining the flows.

Because of this situation and the means used, it is not possible to increase the number of layers, and the known solutions are generally limited to one central layer and one layer on each side.

Moreover, while the axis of the extruder of the main rod is within the axis of the extrusion, that is, horizontal, this is not the case with the other extruders whose supply is vertical, thus increasing the lengths of the channels and the number of changes of direction, which considerably increases the losses of pressure.

SUMMARY OF THE INVENTION

One of the objects of the invention is to obtain a laminar coextrusion unit which eliminates the problems revealed above and which, in particular, facilitates the mounting and dismounting of the essential parts, for example, for replacement or maintenance.

To this end, the subject of the invention is a coextrusion unit of this type comprising:

at least two extruders, a device for joining the flows issuing from the extruders into a global flow, and an extrusion head supplied by the global flow, wherein the joining device comprises a main channel into which open so-called supply channels which convey the different material flows issuing from the extruders, which supply channels are provided with means for restricting the cross-section of the flow, which unit is particularly characterized in that the supply channel connecting each extruder to the main channel is at least partially embodied in a cylindrical plug valve, which valve comprises means for transforming a cylindrical rod into a planar sheet.

BRIEF DESCRIPTION OF THE DRAWINGS

The invention will be clearly understood with the aid of the description below, given as a non-limiting example in reference to the appended drawing which schematically represents.

DETAILED DESCRIPTION OF THE PREFERRED EMBODIMENTS

Figure 1:
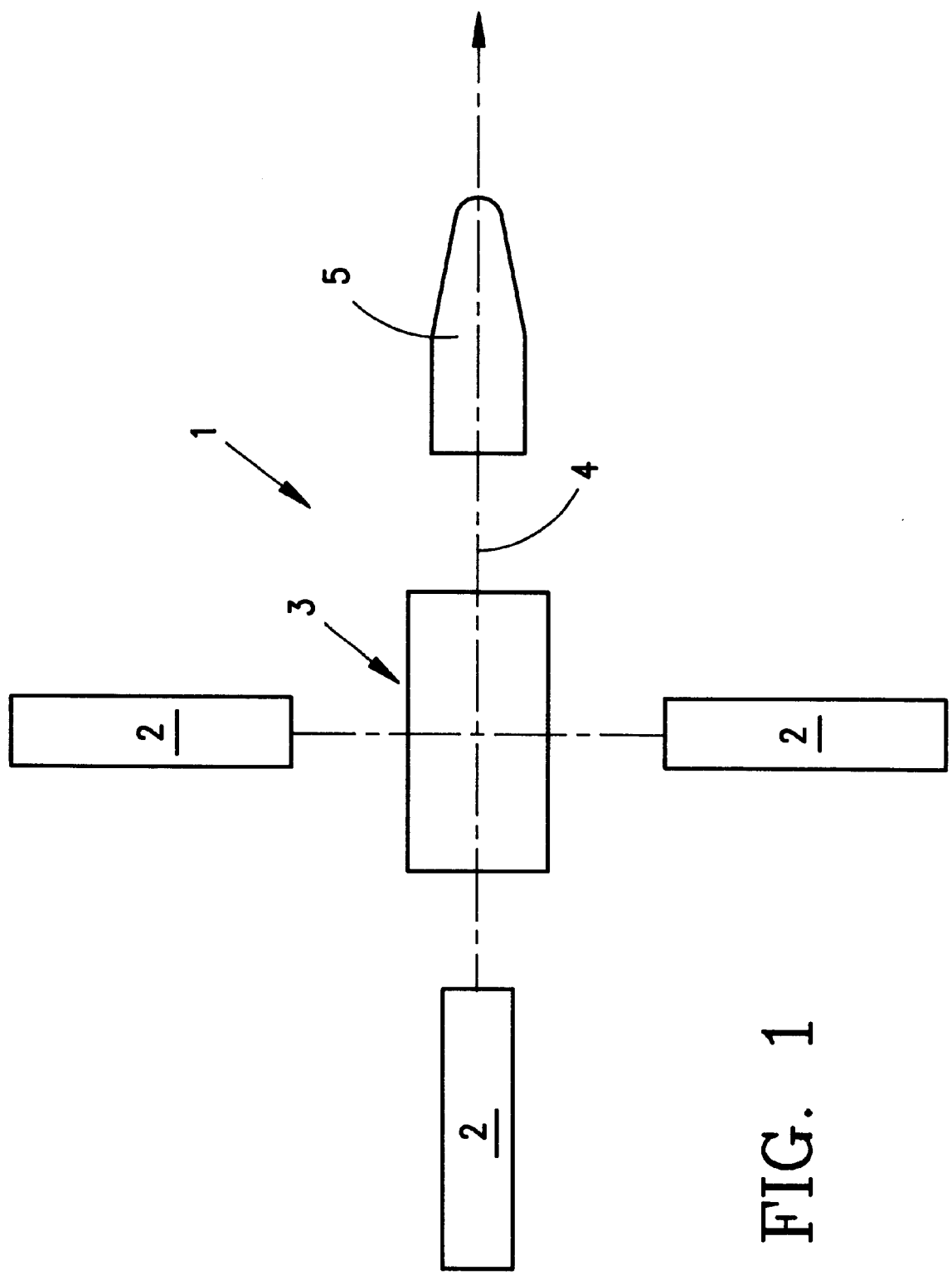
FIG. 1: a coextrusion installation.
Figure 2:
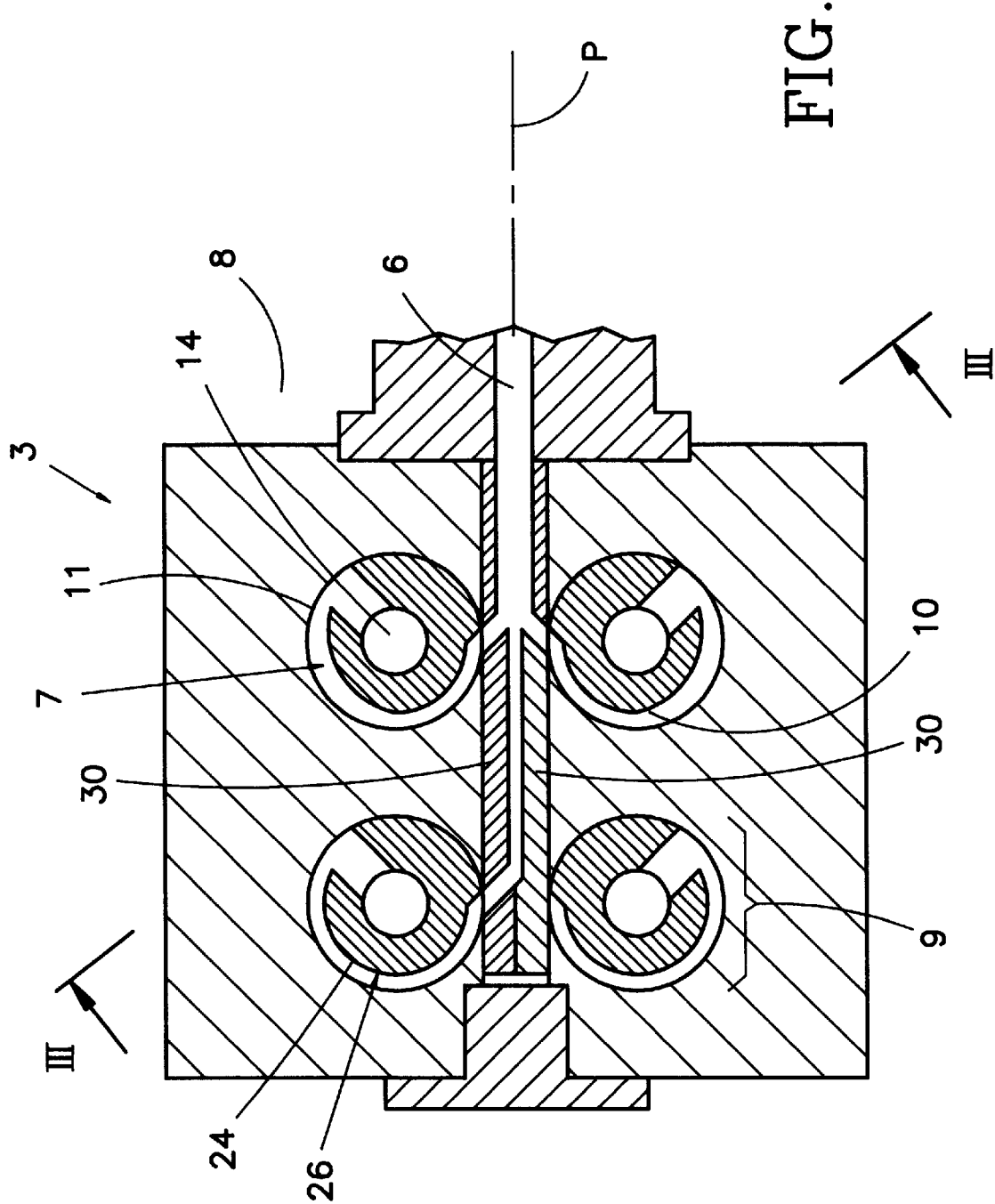
FIG. 2: a cutaway view of a box for joining the flows.
Figure 3:
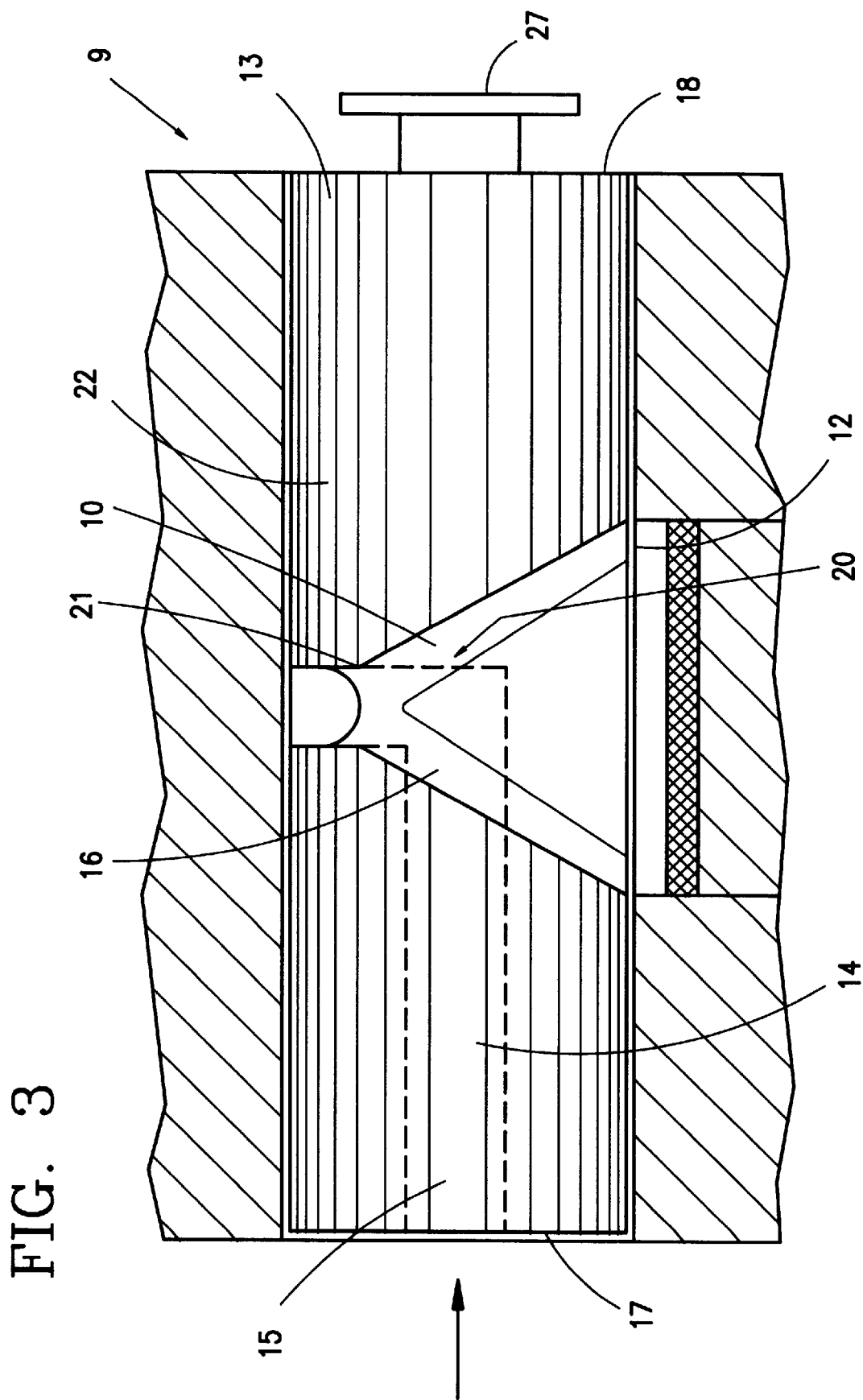
FIG. 3: a view along III—III in FIG. 2.

By referring to the drawing, it may be seen that in order to constitute a sheet (not shown) obtained by superposing layers of plastic materials, a coextrusion unit 1 is used which comprises:

at least two extruders 2, more precisely as many extruders as there are layers of different materials used, a device 3 for joining the flows issuing from the extruders 2 into a so-called global flow 4, this device 3 also being called a distribution box, and an extrusion head 5 supplied by the global flow.

The joining device 3 comprises a main channel 6 into which open annexed channels 7 called supply channels which convey the different flows of material issuing from the extruders, these channels 7 being provided with means 8 for restricting the cross-section of the flow.

The cross-section of the main channel is, for example, rectangular and the longitudinal axis of the main channel is horizontal.

According to the invention, the supply channel 7 connecting each extruder to the main channel 6 is at least partially embodied in a cylindrical plug valve, which valve comprises means 10 for transforming a cylindrical rod into a planar sheet.

According to the invention, the cylindrical plug valve 9 comprises:

a body having a cylindrical bore 11 substantially tangent to the plane P of movement of the flow in the main channel 6, which connects to this main channel 6 through a slot 12 parallel to the longitudinal axis of the bore, a cylindrical plug 13 which fits into the bore 11 and which itself comprises:

an axial channel 14 wherein one 15 of the ends 15, 16 opens to one 17 of the opposing surfaces 17, 18 of the plug 13, to which end 15 the extruder is at least indirectly connected, and wherein the other end 16 connects to one 20 of the ends 20, 21 of a substantially radial channel which opens at its other end 21 to the external surface 22 of the plug 13, at the level of which this external surface of the plug has, on a fraction of its periphery, a taper 24 which, seen from the side, has a fan shape wherein the axis of symmetry is in a plane perpendicular to the axis of rotation of the plug 13 so that the edge of this taper and the wall of the bore create a so-called intermediate channel 26 connecting the axial channel to the slot of the bore.

The shapes of this taper are determined so as to transform a cylindrical rod into a planar sheet.

The shape of this taper is also called a fishtail shape.

This plug valve arrangement is quite advantageous in that it allows easy dismounting, since the plug need only be pulled along its axis of rotation.

The terminal end of the taper 24 is shaped so as to direct the flow running between the edge of the taper 24 and the inner surface of the bore to the slot disposed between the bore and the main channel.

The external wall of the plug 13 located at the other end of the terminal edge of the taper 24 constitutes, for the slot connecting the bore and the main channel, a means for adjusting the cross-section of this slot in accordance with the position of this terminal edge relative to the slot.

For example, when the terminal edge is located in a plane medial to the above-mentioned slot, the cross-section of the flow is reduced by half.

Thus, the geometric transformation means, the means for restricting the cross-section, and the greater part of the supply channel connecting the extruder to the main channel are combined into a single part that is easily interchangeable.

By rotating the plug, it is possible to vary the cross-section of the flow from the extruder, and for this purpose, the surface 18 of the plug opposite the one 17 in which is disposed the inlet of the axial channel 14 is provided with a gripping means 27.

Another advantage of this arrangement is a reduction of the trajectory, which is very short, between the extruder and the main channel.

The angle defined by the two sides of the taper, and the length measured between the intersection of these two sides and the terminal edge of this taper specifically determine the width of the sheet at the outlet of the valve.

This joining device is very compact, which makes it possible to increase the number of extruders without increasing heat losses or losses of pressure.

The insertion of the plugs is done laterally.

It is possible to provide connecting pieces having channels for connecting the extruder to the plug.

The slot of the bore connects to the main channel through a short connecting channel formed in the thickness of the casing of the main channel.

In order to adjust the thickness and the width of the main channel, it is arranged for the walls of this channel to be constituted by interchangeable cartridges 30, which cartridges constitute either the lower casing of the main channel, or the upper casing of this channel, and are joined to one another in a parting plane, which is preferably coplanar to the median horizontal plane of the main channel.

What is claimed is:

1. A device for joining at least two material flows in a laminar coextrusion process, comprising:

at least a first and a second extruder;

a distribution box for joining the flows issuing from each of said first and second extruders into a global flow, said distribution box having disposed therein a main channel through which the global flow passes, and at least a first and a second supply channel, wherein said first supply channel is associated with, and is in fluid communication with, said first extruder, and said second supply channel is associated with, and is in fluid communication with, said second extruder, and wherein each of said at least first and second supply channels has means for restricting a cross-section of a flow therethrough;

at least a first and a second cylindrical plug valve disposed within said distribution box, each of said at least first and second cylindrical plug valves being associated with a respective one of said first and second supply channels, wherein each of said first and second cylindrical plug valves has means for transforming a cylindrical rod into a planar sheet; and an extrusion head in fluid communication with said main channel, said extrusion head being supplied by said global flow exiting said main channel.

2. The device according to claim 1, wherein each cylindrical plug valve comprises:

a body having a cylindrical bore substantially tangent to a plane (P) of movement of the flow in the main channel, said cylindrical bore connecting to said main channel through a slot parallel to a longitudinal axis of the bore, a cylindrical plug which fits into said cylindrical bore and which itself comprises:

an axial channel wherein one of the ends of said axial channel opens to a side surface of the plug, to which end an associated extruder is at least indirectly connected, and wherein the other end of said axial channel connects to a first end of a substantially radial channel, a second end of said radial channel opening to a peripheral surface of the plug at a position where said peripheral surface of the plug has, on a portion of its periphery, a taper (24) which, seen from the side, has a fan shape wherein an axis of symmetry is in a plane perpendicular to an axis of rotation of the plug (13) and wherein said cylindrical bore and said cylindrical plug are so constructed and arranged such that an edge of said taper and an inner wall of the bore create an intermediate channel connecting said axial channel to said slot of the bore.

3. The device according to claim 2, wherein a shape of said taper is selected such that said intermediate channel operates to transform a rod of circular cross-section into a planar sheet, when material is flowed through said intermediate channel.

4. The device according to claim 2, wherein, a terminal edge of said taper is shaped so as to, at a first end, direct a flow running between said edge of the taper and inner wall of the bore toward the slot in the bore connected to said main channel, and the external wall of the plug located at a second end of the terminal edge of the taper (24) constitutes, for the slot connecting the bore and the main channel, means for adjusting a cross-section of this slot as a function of a position of said terminal edge relative to the slot.

5. The device according to claim 1, wherein the insertion of the plugs is done laterally into a side of said distribution box.

6. The device according to claim 2, wherein the insertion of the plugs is done laterally into a side of said distribution box.

7. The device according to claim 2, wherein the slot of the bore connects to the main channel through a short connecting channel formed in a thickness of a casing of said main channel.

8. The device according to claim 7, wherein a thickness and a width of said main channel are defined by one or more interchangeable cartridges inserted in said distribution box.

9. The device according to claim 8, wherein said one or more interchangeable cartridges are joined to one another in a parting plane so as to form an upper and lower casing, which parting plane is coplanar to a median horizontal plane of said main channel.

10. The device according to claim 1, wherein a number of extruders provided in said device is equal to a number of layers of different materials to be laminarly coextruded.

11. The device according to claim 2, wherein said distribution box constitutes said body having said cylindrical bore therein for each of said cylindrical plug valves.

\* \* \* \* \*